July 8, 1969         F. X. SPIEGEL ET AL         3,454,210
EASY OPENING AND RECLOSABLE PACKAGE, FILM THEREFOR AND PROCESS
Filed May 23, 1968                    Sheet __1__ of 2
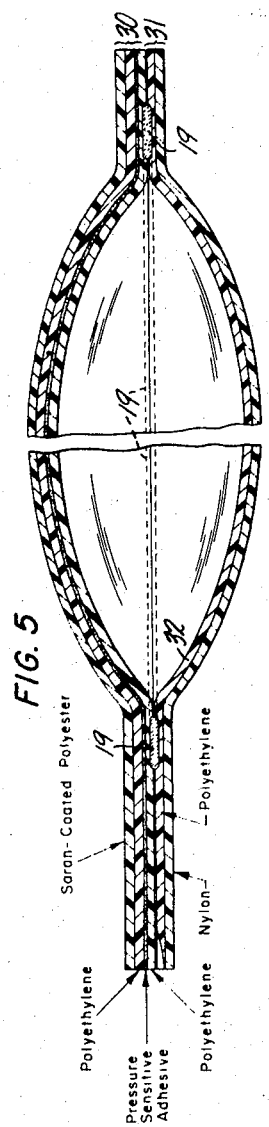
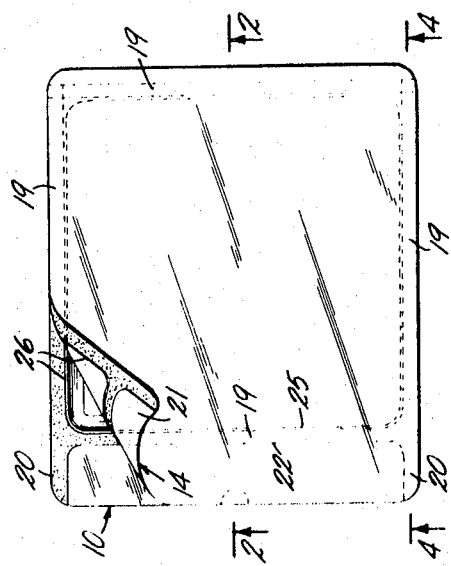
INVENTORS.
FRANCIS X. SPIEGEL &
VICTOR MONIA
BY
their ATTORNEYS.

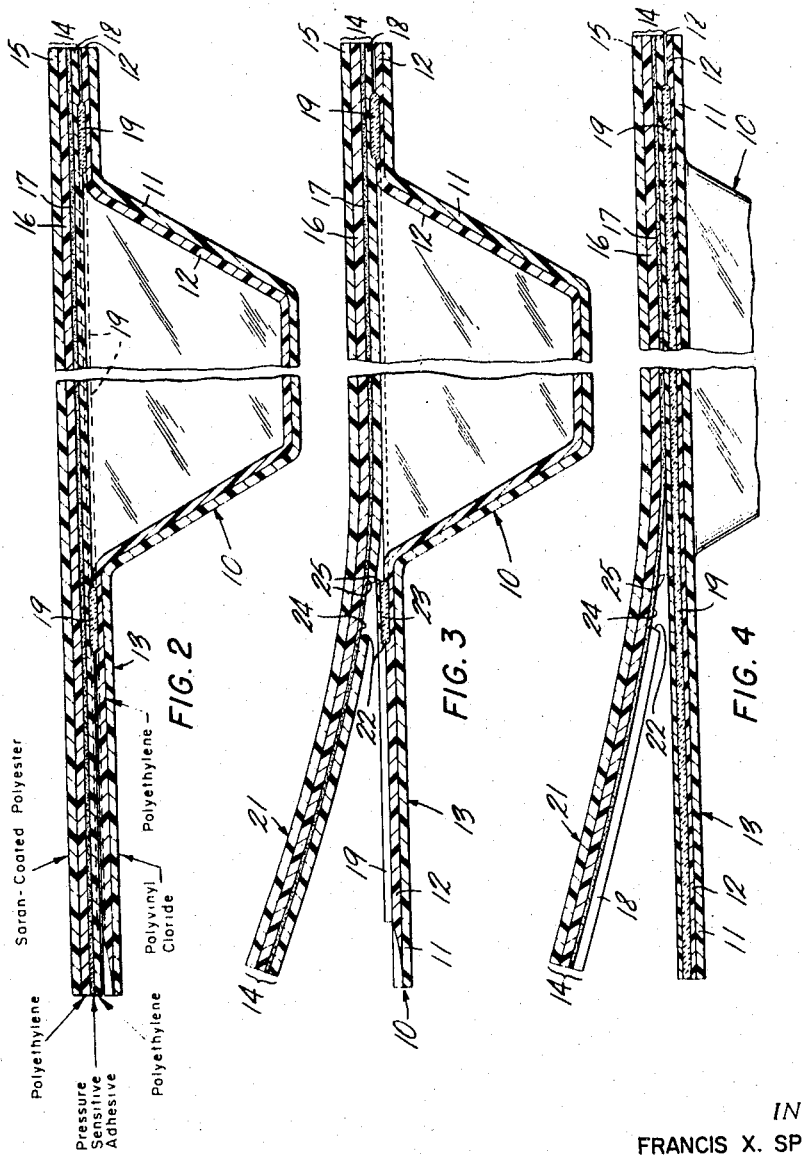

United States Patent Office 3,454,210
Patented July 8, 1969

3,454,210
EASY OPENING AND RECLOSABLE PACKAGE, FILM THEREFOR AND PROCESS
Francis X. Spiegel, Cedar Grove, N.J., and Victor Monia, Palo Alto, Calif., assignors to Standard Packaging Corporation, New York, N.Y., a corporation of Virginia
Continuation-in-part of application Ser. No. 652,456, July 11, 1967. This application May 23, 1968, Ser. No. 735,493
Int. Cl. B65d 75/30; B32b 27/08
U.S. Cl. 229—43
16 Claims

ABSTRACT OF THE DISCLOSURE

A package having an easy opening, reclosable seal is formed by bonding together preselected areas of upper and lower members, at least one of which is a laminate having a pressure-sensitive adhesive as one layer of the laminate. The pressure-sensitive adhesive layer is carried by a base web and is covered by a bondable, rupturable film to form one member of the package. The bondable film is bonded to the surface of the other member to complete the package. This bond, and the bond formed by the pressure-sensitive adhesive between the base film and the rupturable film have a strength in excess of the strength required to tear the rupturable film.

---

This is a continuation-in-part application of application Ser. No. 652,456, filed July 11, 1967.

This invention relates to an easy opening, reclosable package and in particular, to a package having a reclosable feature using a pressure-sensitive adhesive and process of making it. The invention also relates to a laminated packaging film useful in forming a reclosable package and to a method of making the film.

A recurring criticism of plastic packaging materials or systems of utilizing them has been the difficulty in opening the package to get at the contents. Another major difficulty has been that once the package is opened and the contents not used completely, the residual contents, if meat or cheese, for example, must be rewrapped in "wax paper" or placed in a storage dish until consumed. These problems have been the subject of considerable attention in the vacuum packaging of foods. The sealing means provides a closure which must be sufficiently tight to preserve the vacuum within the container. It has generally been the experience of those in the art that devices which make these packages easily opened, generally also incorporate some aspect which reduces the effectiveness of the seal and this defeats the main purpose of the packaging system.

An attempt to provide a reclosable feature has involved an "encapsulation" process. In accordance with this system, a coating is applied which, when dried, does not exhibit any tackiness or stickiness tendencies. However, when heat or pressure is applied, the coating structure is broken down and a permanently tacky substance is produced on the film. This system is costly and is limited in its application.

It is an object of the present invention to provide an easy opening package utilizing laminated packaging film.

It is another object of this invention to provide a package which may be easily opened and which has a positive reclosable feature.

It is a further object of this invention to provide a hermetically sealed gas-tight package which may be easily opened and which has a positive reclosable feature.

It is still another object of this invention to provide a laminated packaging film useful in forming a reclosable package.

Additional objects not specifically set forth will be apparent from the following detailed description of the invention.

Referring to the drawings:

FIG. 1 shows a top view of one type of package using a base member with a preformed pocket made according to this invention, partially opened;

FIG. 2 is a vertical sectional view of the package shown in FIG. 1, taken along the lines 2—2 thereof and looking in the direction of the arrows;

FIG. 3 shows the structure of FIG. 2 after opening;

FIG. 4 is a vertical sectional view of the package shown in FIG. 1, taken along the lines 4—4 and looking in the direction of the arrows; and FIG. 5 is a cross section of a flexible pouch representing another embodiment of the invention.

The present invention provides a package of plastic film which may be easily opened and then resealed along the initially bonded areas. The package is either rigid, semi-rigid, or flexible as required, depending upon the nature of the base member, is readily adapted for the packaging of food materials and can easily be made on existing packaging machinery which uses heat-sealing techniques.

FIGS. 1–4 of the drawings illustrate a vacuum sealable package for holding meat or cheese slices having a semi-rigid base member, and represents a preferred embodiment of this invention. Referring to FIGS. 1–4, numeral 10 represents a base member which is a semi-rigid plastic tray made by vacuum-forming a laminate of polyvinyl chloride 11 with a surface layer of polyethylene 12. The base member 10 may have vertical or horizontal corrugations on its sides for additional stiffness. A lip portion 13 is preferably provided on base member 10 to facilitate handling, hanging and opening of the package. A gas barrier layer, preferably a copolymer of vinylidene chloride and acrylonitrile (not shown) is provided between the polyvinyl chloride 11 and the polyethylene layer 12.

The cover member 14 of the package shown in FIGS. 1–4 is formed from a laminated plastic sheet. The cover member 14 of the preferred embodiment shown in the drawings comprises an upper film 15 of a polyethylene terephthalate resin, to which has been aplied a first layer of polyethylene 16, a layer of pressure-sensitive adhesive 17 and a rupturable layer of polyethylene 18.

The upper film 15, together with the first polyethylene layer 16, provides a supporting film for the cover member 14 and is of sufficient weight that will not tear readily and will not curl excessively. One suitable material for the upper film 15 is 50 M 24 Mylar, a 50 gauge polyethylene terephthalate resin film sold by Du Pont. It is supplied with a gas-barrier layer, 0.1 mil thick (not shown), of a saran type copolymer of vinylidene chloride and acrylonitrile on the treated surface.

The surface of the upper film 15 having the gas-barrier layer is then treated with oxidative influences to increase the free surface energy thereof as measured by an increase in wettability to water (an electrostatic discharge or crona discharge treatment, as described in the Kritchevar patent, U.S. No. 2,916,620). The first layer of polyethylene 16 is applied thereto by an extrusion lamination technique. A water-based primer, polyethylene imine (not shown) is first applied to the crona discharge treated surface. A polyethylene film 0.5 mil thick is then applied by melt extrusion techniques to the primed surface and a further preformed polyethylene film 1.5 mils thick is immediately applied to the extruded polyethylene while it is still in the molten state. The laminate is then passed through pressure rolls to insure good adherence of the first polyethylene layer 16 to the upper film 15.

The exposed surface of the first polyethylene layer 16 is next treated with oxidative influences by subjecting it to an electrostatic discharge treatment, as described above, and a pressure-sensitive adhesive layer 17 is applied. One suitable adhesive is a milled GR–S rubber based adhesive system containing Pentalyn H tackifying resin sold by Talon Adhesives. The preferred range of rates of application is from 3 to 8 pounds of adhesive solids per ream. The adhesive layer 17 is applied with a coating roll, and the web is then dried to insure removal of all solvent.

The rupturable layer of polyethylene 18 is a preformed film, 1 mil thick, one surface of which is treated with oxidative influences, preferably by the electrostatic discharge treatment described above. The rupturable layer 18 is then applied to the adhesive layer 17, the treated surface of the sheet facing the adhesive layer 17.

In forming the package shown in FIG. 1, the base member 10 is first vacuum-formed from the sheet of laminated polyvinyl chloride having a surface layer of polyethylene. A cover member 14 is then applied from the sheet of laminated plastic material described above to the base member 10 by a heat seal 19 around the outer periphery of the formed pocket in the base member 10. The heat sealed area preferably extends laterally along the edge of the tab 13 as shown at 20 in FIG. 1, in order to prevent curling of the tab portion 21 of cover member 14. The heat sealing operation fuses the polyethylene layers 18 and 12 to form a gas tight bond.

When opening the formed package, one simply grasps the free end 21 of the cover film 14 and peels it from the base member 10. The portion of the rupturable polyethylene layer 18 of the cover film 14 heat sealed to the base member 10 is torn and remains with the base member 10, thus exposing a free surface of pressure-sensitive adhesive 17 in the corresponding area 24 of the cover film 14.

The relationships between the strengths of the various films and bonds formed between the various layers of the package of this invention are an important feature of the invention. These relationships are best explained in terms of conditions which should prevail at the time that the package is opened. The opening is accomplished by simply grasping the tabs 13 and 21 and by pulling them apart. When this occurs, the laminates of base member 10 and of cover member 14 must be so well bonded that no separation thereof occurs; it must act as an integral web.

With regard to cover member 14, the rupturable layer of polyethylene 18 must be capable of rupturing along the edge of the heat sealed area 19. It has been found that the polyethylene layer 18, when at the preferred low or medium density polyethylene, should be no more than about 1.5 mils thick. A thickness of 1 mil is preferred, while a thickness of 0.5 mil may be used to advantage. A thickness of more than 1.5 mils requires excessive force to tear and is unsuitable to most package consumers.

Another consideration is the strength of the bond formed by the heat seal between the base member 10 and cover member 14. This bond must be able to withstand, without change, the force required to tear the rupturable polyethylene layer 18, so that the bonded portion of layer 18 will be pulled away from and expose the pressure sensitive adhesive layer 17. For the same reason, it must be stronger than the bond formed between the pressure sensitive adhesive layer 17 and the rupturable polyethylene layer 18.

Still another important consideration is that the strength required to tear the rupturable layer 18 be less than the strength of the bond formed by the pressure sensitive adhesive 17 between the first polyethylene layer 16 and the rupturable film 18. When, in the application of force to open the package of this invention, a choice is presented between a rupture of the rupturable film 18 and a delamination of the cover member 14 along the pressure sensitive adhesive layer 17, the former should take place.

In further explanation of this point, reference is made to FIGS. 2 and 3 in the drawings. When tabs 21 and 13 of the completed package shown in FIG. 2 are pulled apart, the first resistance encountered is the edge 22 of the heat sealed area 19. On continued application of separation forces, the rupturable polyethylene layer 18 tears along the edge 22, leaving a ridge portion 23 of layer 18 attached by the heat seal bond to the polyethylene layer 12. Continued application of separating forces causes separation of the cover member 14 from base member 10 along the pressure-sensitive adhesive layer 17 in the portion 24 thereof immediately over the ridge portion 23, this path of separation being the one offering the least resistance.

With continued application of the separating forces, the members 14 and 10 separate along adhesive layer 17 in area 24 thereof until edge 25 of the heat seal area 19 is reached. At this point, the adhesive forces holding the rupturable layer 18 to the first polyethylene layer 16 must have a strength in excess of that required to again tear the rupturable film 18 at point 25. The film 18 is torn at point 25 and the package is opened along the edge of the package bearing the tabs 13 and 21. Still further application of the separating forces will cause the cover member 14 to peel back along each side of the package, the separation occurring along the pressure-sensitive adhesive layer 17 in the heat sealed area as shown particularly in FIG. 4, and with accompanying rupture of the rupturable layer 18 along the edge of the heat seal, as shown at 26 in FIG. 1.

Resealing of the opened package is simply accomplished by returning the cover member 14 to its original position over the base member 10, and by simply pressing area 24 over ridge area 23 with the fingers.

FIG. 5 shows an alternate preferred embodiment in the form of a gas-tight flexible pouch of the type used to package frozen vegetables and similar materials. The cover member 30 is of the same construction as the cover member 14 described above. The base member 31 is a flexible packaging film having a heat sealable polyethylene layer 32 on one surface thereof. A preferred film for use as a base member in preparing a flexible pouch of the type shown comprises a base web of nylon, an intermediate primer coating thereon of a dibutyl tin dilaurate-catalyzed urethane prepolymer, a gas barrier layer of a saran type copolymer of vinylidine chloride and acrylonitrile over the primer, a second coating of the primer over the gas barrier layer and a final layer of polyethylene. The surface of the polyethylene is treated with oxidative influences to increase the free surface energy thereof as measured by an increase in wettability to water, using the electrostatic discharge treatment discussed above.

Another preferred embodiment of the invention comprises a system wherein the bonded surfaces are polyvinyl chloride rather than polyethylene. In this embodiment the base 10, as in FIG. 3, comprises a formed rigid polyvinyl chloride film 7.5 mils thick. The thickness of the base can, of course, be varied where it is desirable to change the rigidity or other characteristics of the base.

The cover member 14 used in this instance comprises a laminated plastic sheet as shown in FIGS. 1–4 except for the substitution of a polyvinyl chloride film for the rupturable layer of polyethylene 18. Thus, the cover member 14 in this instance comprises an upper film of polyethylene terephthalate resin to which is applied, in sequence, a first layer of polyethylene, a layer of pressure-sensitive adhesive and a covering layer comprising a rupturable polyvinyl chloride film. The polyvinyl chloride film may suitably have a thickness of about 1.5 to 0.5 mils, a thickness of 1.0 mil being satisfactory in many instances. This rupturable vinyl film is susceptible to forming a heat seal with the polyvinyl chloride surface of the formed web, which seal has a strength which is greater than that required to rupture the rupturable vinyl film.

One specific material which has been found to provide a suitable rigid base is sold by American Hoechst as U.S.–2000. This material is an unplasticized, glass clear, polyvinyl chloride film 7.5 mils thick, having a specific gravity of 1.36, a tensile strength (longitudinal and transverse) of greater than 7500 p.s.i. as measured by ASTM D–792, a heat distortion temperature of 167° F. (ASTM D–1637) and a heat sealing range of about 300° to 380° F.

A vinyl film suitable for use as the rupturable film of cover member 14 is one sold by the Cadillac Plastics & Chemical Company as C–102. This material is a natural polyvinyl chloride film, 1 mil thick, having a specific gravity of 1.36 and a tensile strength according to ASTM D–882, method B, either direction of 6500 p.s.i. average.

A structure similar to that shown in FIG. 2 was made wherein the rupturable polyethylene film of the cover member 14 was replaced by the polyvinyl chloride film C–102 described above, by direct application of the preformed film to the pressure-sensitive adhesive layer. This cover film was then applied directly to the base member of the U.S.–2000 polyvinyl chloride described above. The materials were heat-sealed at 325° F. using 40 p.s.i., a 0.5 second dwell and a flat bar sealer. The seal was then separated with an Instron stress-strain tester which records the force required to separate two joined films. The Instron was operated at 12" per minute speed for both the chart and the head, with a 2" gap. The average force in pounds per 1" strip was 3.5 pounds. The initial fracture was in the rupturable polyvinyl film and the separation of the cover member from the base took place along the pressure-sensitive adhesive layer.

While the invention has been described in terms of several preferred embodiments, it is recognized that the invention is useful in a wide variety of packages and that a wide variety of materials may be used in their construction. The preferred embodiments described above are gas-tight food packages, but the easy-opening and resealable features can be used in many other types of packages.

The pressure-sensitive adhesive layer can be used in the base member rather than the cover member, so long as it is covered with a rupturable film and so long as the other considerations relating to relative strengths of the various parts of the structure are followed. Furthermore, a flexible film carrying the layer of pressure-sensitive adhesive and the rupturable film, such as the preferred cover member 14 described above, can be doubled on itself and used as both base and cover members of a flexible package.

Similarly, the supporting film of the cover member may be varied. For example, nylon, polypropylene or cellophane can be used in place of the polyethylene terepthalate of the cover member 14, and adhesive laminated structures can be used in place of the extrusion laminate described above. For example, a first polyethylene layer can be laminated to the saran-coated surface of a polyethylene terephthalate film using a urethane based adhesion-promoting primer between them. In the semi-rigid package, a styrene base web may be used in place of the polyvinyl chloride.

The sealing surfaces may be of any suitable heat-sealable type, including vinyls, styrenes, sarans, propylenes and the like. Furthermore, the bond need not be a fusion bond caused by heat-sealing, but may be formed with adhesives or in any other manner, so long as the considerations regarding relative strengths of bonds and films set forth above are observed.

The pressure-sensitive adhesive should be capable of retaining its characteristics over a long period of time and can be any of a number of available materials. It should contain a relatively large amount of tackifying agent to insure good resealing characteristics. Also, where the package is to be used for foods, the pressure-sensitive adhesive should be of a type which does not impart undesirable flavors and odors to the foods during storage. Certain pressure-sensitive adhesives, while suitable in all functional respects, will cause undesirable flavors and odors in mild flavored foods, such as ham and cheese. This unwanted side effect is apparently caused by migration of one or more of the ingredients of the pressure-sensitive adhesive through the rupturable polyethylene film and into the contents of the package. It has been found that this problem can be largely avoided by providing a gas-barrier layer on the rupturable film. A suitable material for this purpose is a saran type copolymer of vinylidine chloride and acrylonitrile. The saran coating is preferably about 0.1 mil thick and is intermediate the pressure-sensitive adhesive layer and the rupturable polyethylene layer.

We claim:
1. An easy opening resealable package comprising a base member and a cover member, the members being bonded together in a manner to form a cavity between them for retaining articles, the base member being a formed laminate of polyethylene and polyvinyl chloride forming a semi-rigid package tray and the cover member being a film laminate comprising a supporting film of polyethylene terephthalate, a first layer of polyethylene film, a layer of pressure-sensitive adhesive and a rupturable layer of polyethylene film, both the bond between the cover member and the base member and the bond formed by the pressure sensitive-adhesive between the supporting film layer and the rupturable film having strengths in excess of the strength required to tear the rupturable film.

2. The package of claim 1, wherein the rupturable layer of polyethylene film has a thickness no greater than 1.5 mils.

3. An easy opening resealable package comprising a base member and a cover member, the members being bonded together in a manner to form a cavity between them for retaining articles, the base member comprising a flexible packaging film comprising a nylon base film and a polyethylene surface layer thereon, and the cover member being a laminate comprising a polyethylene terephthalate film base, a first layer of polyethylene film, a layer of pressure-sensitive adhesive and a rupturable layer of polyethylene film, both the bond between the cover member and the base member and the bond formed by the pressure-sensitive adhesive between the supporting layer and the rupturable film having strengths in excess of the strength required to tear the rupturable film.

4. The package of claim 3, wherein unsealed tab portions of both the base member and cover member materials are provided.

5. A packaging film comprising, in intimate joined lamination, a saran coated polyethylene terephthalate resin film as a supporting film layer, a film of polyethylene having a thickness not exceeding 1.5 mils as a rupturable film layer, and a layer of pressure-sensitive adhesive intermediate the two aforementioned layers, the bond formed by the pressure-sensitive adhesive between the supporting film layer and the rupturable film layer having a strength in excess of the strength required to tear the rupturable film.

6. The packaging film of claim 5, wherein the rupturable film layer of polyethylene is provided with a gas-barrier layer of a saran type copolymer.

7. A packaging film comprising, in intimate joined lamination, a supporting film layer, a film of polyethylene having a thickness not exceeding 1.5 mils as a rupturable film layer and a layer of pressure-sensitive adhesive intermediate the two aforementioned layers, the bond formed by the pressure-sensitive adhesive between the supporting film layer and the rupturable film layer having a strength in excess of the strength required to tear the rupturable film.

8. The packaging film of claim 7, wherein the supporting film layer is selected from the group consisting of nylon, polyvinyl chloride, polypropylene, cellophane and polyethylene terephthalate.

9. The packaging film of claim 8, wherein a gas barrier layer of saran is interposed between the supporting film layer and the layer of pressure-sensitive adhesive.

10. A packaging film comprising, in intimate joined lamination, a supporting film layer, a film of polyvinyl chloride having a thickness not exceeding 1.5 mils as a rupturable film layer, and a layer of pressure-sensitive adhesive intermediate the two aforementioned layers, the bond formed by the pressure-sensitive adhesive between the supporting film layer and the rupturable film layer having a strength in excess of the strength required to tear the rupturable film.

11. The packaging film of claim 10, wherein the supporting film layer is selected from the group consisting of nylon, polyvinyl chloride, polypropylene, cellophane and polyethylene terephthalate.

12. The packaging film of claim 10, wherein a gas barrier layer of saran is interposed between the supporting film layer and the layer of pressure-sensitive adhesive.

13. A package comprising a container portion, a cover portion, a heat sealable layer on both said container and cover portions fused together in a pattern around the outer periphery of the container portion to form a hermetic seal between the container and cover portions, unsealed extensions of said container and cover portions extending from one side of the package beyond the hermetic seal, said unsealed extensions being separable to separate the container and cover portions when the package is to be opened, and an adhesive layer interposed between the hermetic seal and one of said portions so that when the extensions of the container and cover portions are separated, the heat sealable layer adjacent the adhesive layer will rupture and remain fused to the other heat sealable layer, both the bond formed by the hermetic seal and the bond formed by the adhesive layer between the hermetic seal and the one of said portions having strengths in excess of the strength required to rupture the said heat sealable layer adjacent the adhesive layer.

14. The package of claim 13 wherein the adhesive layer interposed between the hermetic seal and one of said package portions is pressure-sensitive adhesive.

15. A packaging film comprising, in intimate joined lamination, (1) a supporting film layer comprising a saran-coated polyethylene terephthalate resin film, the layer being treated on its saran-coated surface with crona discharge, (2) a polyethylene imine primer uniformly coated on the treated surface, (3) an extrusion laminated first layer of polyethylene on the primed surface having a thickness of about 2 mils, the exposed surface of the polyethylene being treated by subjecting it to oxidative influences to increase the free surface energy thereof as measured in increased wettability to water, (4) a layer of pressure-sensitive adhesive uniformly applied to the treated polyethylene surface at a level from about 3 to about 8 pounds per ream of film, and (5) a rupturable polyethylene film, one surface of which is treated with oxidative influences to increase the free surface energy thereof as measured by increased wettability to water, the polyethylene film not exceeding 1.5 mils in thickness, and its treated side being applied to the pressure-sensitive layer, the bond formed by the pressure-sensitive adhesive between the extrusion laminated first layer of polyethylene and the rupturable polyethylene film having a strength in excess of the strength required to tear the rupturable film.

16. A packaging film comprising, in intimate joined lamination, (1) a supporting film layer comprising a saran-coated polyethylene terephthalate resin film, the layer being treated on its saran-coated surface with crona discharge, (2) a polyethylene imine primer uniformly coated on the treated surface, (3) an extrusion laminated first layer of polyethylene on the primed surface having a thickness of about 2 mils, the exposed surface of the polyethylene being treated by subjecting it to oxidative influences to increase the free surface energy thereof as measured in increased wettability to water, (4) a layer of pressure-sensitive adhesive uniformly applied to the treated polyethylene surface at a level from about 3 to about 8 pounds per ream of film, and (5) a rupturable polyvinyl chloride film not exceeding about 1.5 mils in thickness applied to the pressure-sensitive layer, the bond formed by the pressure-sensitive adhesive between the extrusion laminated first layer of polyethylene and the rupturable polyethylene film having a strength in excess of the strength required to tear the rupturable film.

References Cited

UNITED STATES PATENTS

| | | | |
|---|---|---|---|
| 2,954,116 | 9/1960 | Maso et al. | 206—56 |
| 3,192,091 | 6/1965 | Hey et al. | 229—62 X |
| 3,202,271 | 8/1965 | Kirk | 206—56 |
| 3,272,422 | 9/1966 | Miller | 229—43 |
| 3,335,939 | 8/1967 | Robinson | 229—43 |

DONALD F. NORTON, *Primary Examiner.*

U.S. Cl. X.R.
161—252, 406; 229—3.5, 51

Disclaimer 3,454,210.—*Francis X. Spiegel*, Cedar Grove, N.J., and *Victor Monia*, Palo Alto, Calif. EASY OPENING AND RECLOSABLE PACKAGE, FILM THEREFOR AND PROCESS. Patent dated July 8, 1969. Disclaimer filed Sept. 4, 1973, by the assignee, *Standard Packaging Corporation*.

Hereby enters this disclaimer to claim 13 of said patent.

[*Official Gazette December 11, 1973.*]